Oct. 4, 1955 — A. J. HANDEL — 2,719,682
FOLDABLE AIRCRAFT WING WITH MECHANISM FOR OPERATING
AND LOCKING THE OUTBOARD SECTION THEREOF
Filed Feb. 16, 1953 — 3 Sheets-Sheet 1

INVENTOR.
ALFRED J. HANDEL
BY Munn & Liddy
ATTORNEYS

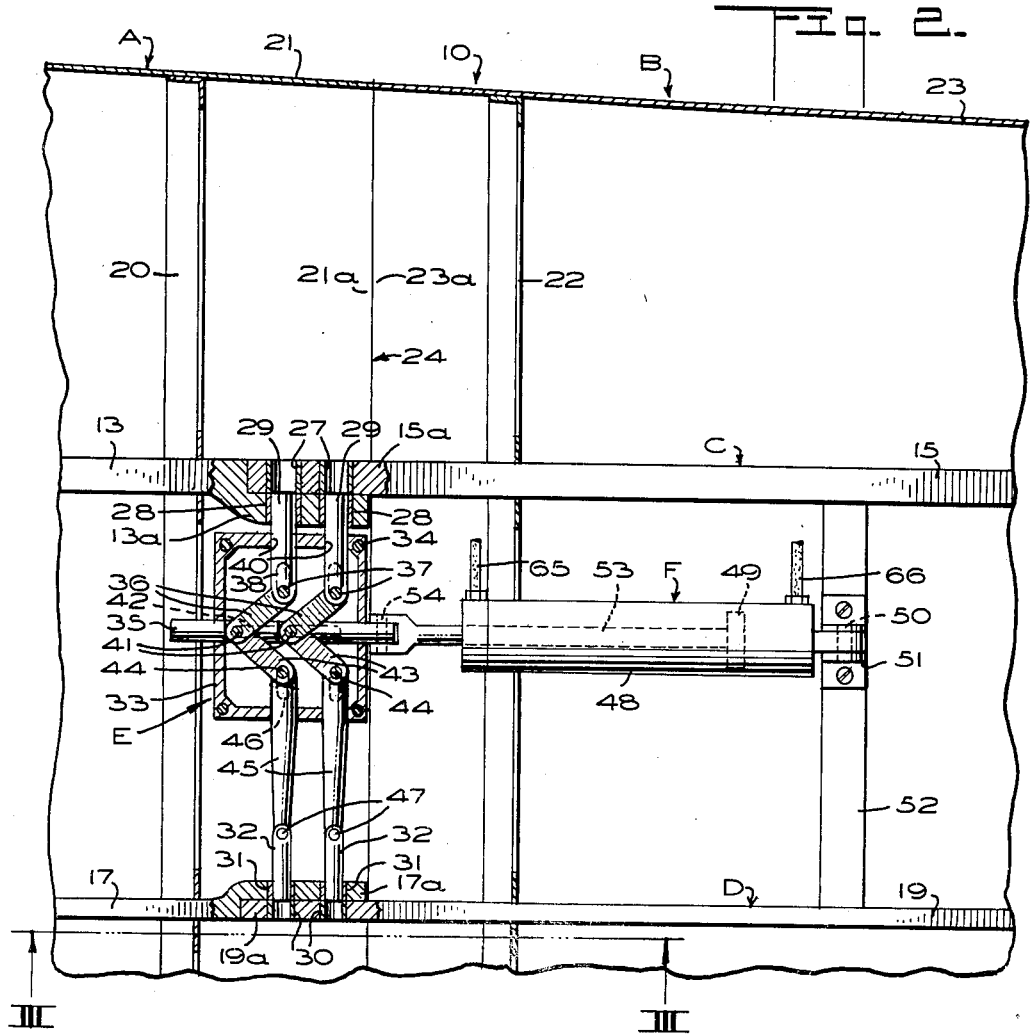
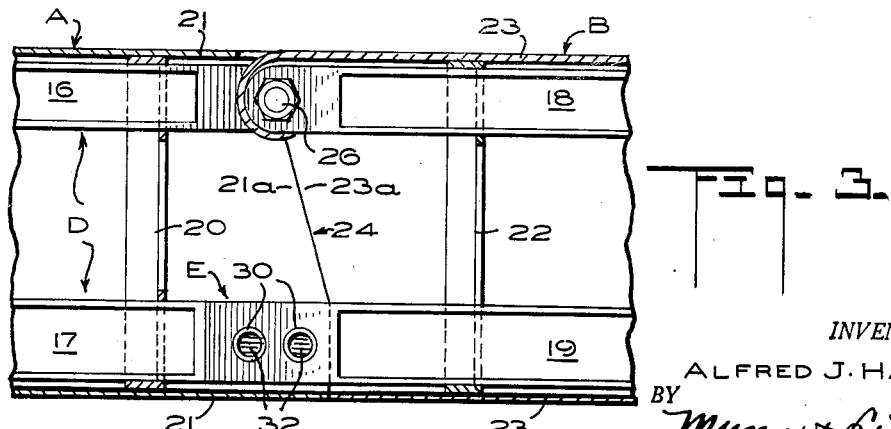

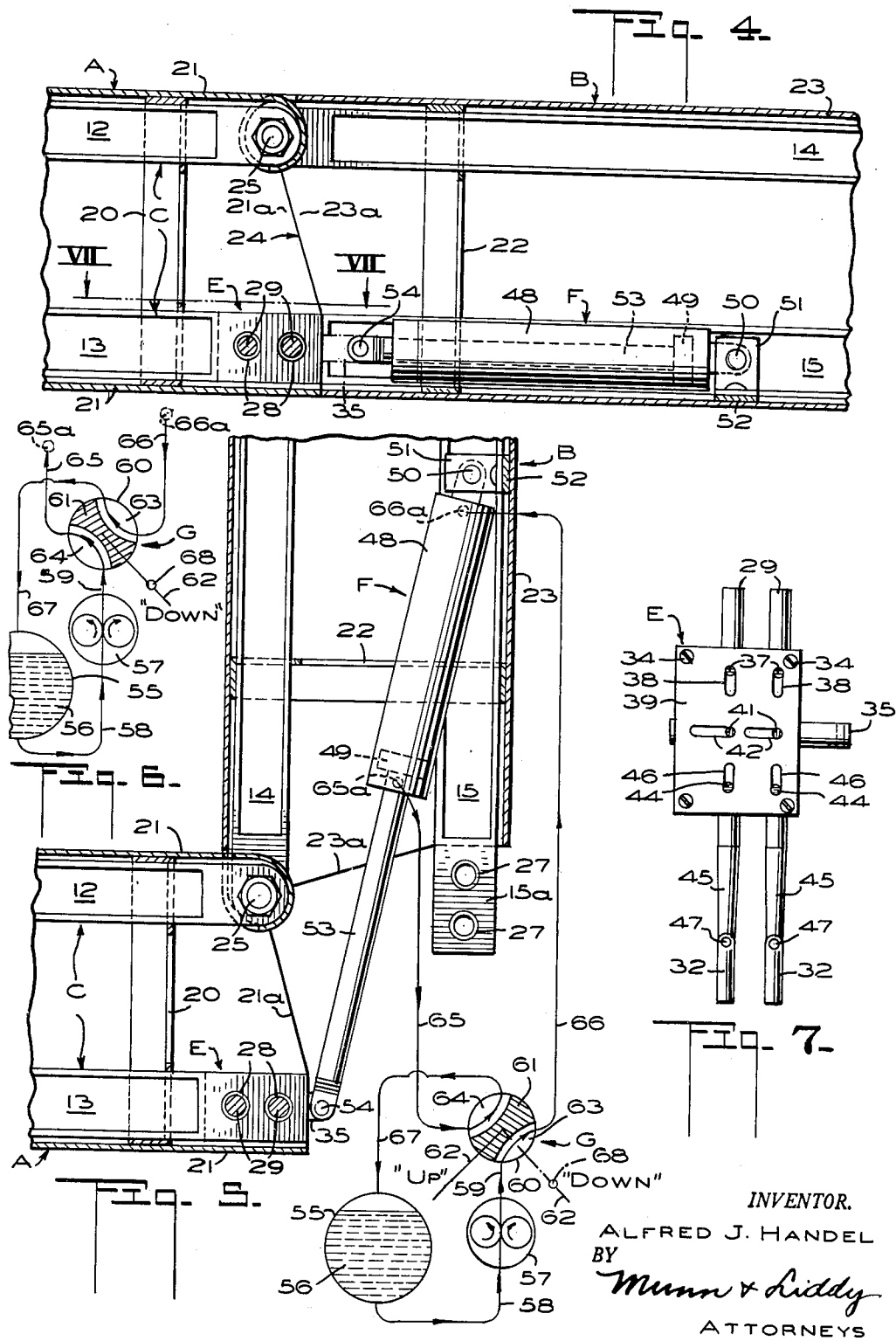

United States Patent Office 2,719,682
Patented Oct. 4, 1955

2,719,682

FOLDABLE AIRCRAFT WING WITH MECHANISM FOR OPERATING AND LOCKING THE OUTBOARD SECTION THEREOF

Alfred J. Handel, Alameda, Calif.

Application February 16, 1953, Serial No. 337,164

4 Claims. (Cl. 244—49)

The present invention relates to improvements in a foldable aircraft wing with mechanism for operating and locking the outboard section thereof. It consists of the combinations, constructions and arrangement of parts, as hereinafter described and claimed.

In order to conserve storage space for aircraft, such as fighters aboard carriers, it has been the practice for many years to provide foldable wings on such planes. Broadly speaking, this type of a wing includes inboard and outboard sections, which are hingedly secured together. The outboard section is swingable from a lowered active position, in which it forms a lateral continuation of the inboard section, into an upwardly-extending raised or inactive position.

Moreover, the inboard and outboard sections are interlocked prior to flight, by a rather complicated mechanism, and they must be unlocked before the outboard section may be folded. Also, a separate apparatus is provided in conventional designs for raising and lowering the outboard section, which indeed is far from being simple.

As the cardinal object of this invention, it is proposed to provide herein a mechanism for locking down the outboard section of a foldable aircraft wing so as to obtain an extremely strong lock, yet at the same time keep this mechanism as small, efficient and compact as possible.

It is further proposed to provide a single actuator in each wing that is designed in such a manner as to accomplish all of the locking and unlocking operations of the sections, with this same mechanism serving the additional function of raising and lowering the outboard section relative to the inboard.

Another object of the invention is to place the actuator in the outboard section of the wing to allow all possible room inboard for guns, ammunition boxes, fuel, tanks, etc., which may be placed in the wing.

Other objects and advantages will appear as the specification continues. The novel features will be pointed out in the claims hereunto appended.

Drawings

For a better understanding of the invention here involved, reference should be had to the accompanying drawings, forming part of this application, in which:

Figure 2 is a fragmentary view similar to Figure 1, but disclosing the outboard section unlocked and ready for being folded into an upwardly-extending position;

Figure 3 is a vertical sectional view taken along the plane III—III of Figure 2 just in back of the rear spar;

Figure 4 is a vertical sectional view taken along the line IV—IV of Figure 1, and disclosing the forward spar from the inside of the extended wing;

Figure 5 is a view corresponding to Figure 4, but illustrating the outboard section of the wing raised into an inactive position extending upwardly from the inboard section, and further including a diagrammatic disclosure of a suitable control mechanism for operating the wing-locking and wing-moving actuator;

Figure 6 shows this actuator mechanism adjusted for lowering the outboard section of the wing into prolongation with the inboard section thereof; and Figure 7 is a top plan view of a wing-locking toggle mechanism, as observed from the plane VII—VII of Figure 4, this mechanism being provided for interlocking the inboard and outboard sections of the wing in active flying relation with one another.

Figure 1:
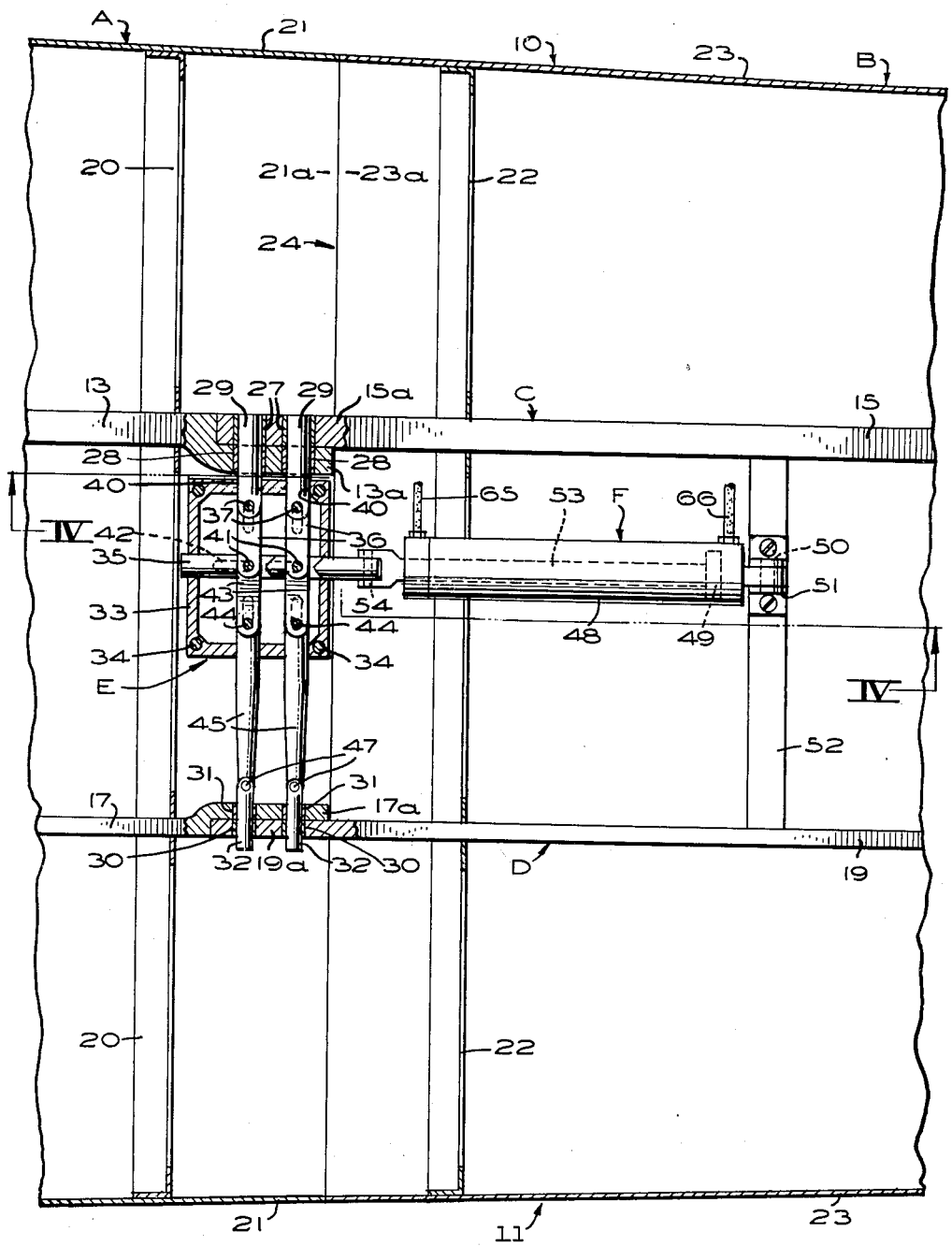
Figure 1 is a horizontal sectional view taken through my foldable aircraft wing, with the outboard section locked down in active position to extend laterally beyond the inboard section.

While I have shown only the preferred form of my invention, it should be understood that various changes, or modifications, may be made within the scope of the annexed claims without departing from the spirit thereof.

Detailed description

Referring to the drawings, it will be noted that I have provided a foldable wing for an aircraft, which includes inboard and outboard sections A and B, respectively. These sections may be swung into alignment with one another so as to provide a continuous wing structure, as shown in Figures 1–4, or the outboard section B may be folded upwardly relative to the inboard section A, thus requiring a reduced storage space for the aircraft. The leading and trailing edges of the wing are indicated generally at 10 and 11, respectively (see Figure 1).

With particular reference to Figures 1 and 2, there is disclosed front and rear spars designated at C and D, respectively, which extend laterally through the interior of the wing structure. It will be seen from the drawings that the front spar C has been shown as being about twice as heavy as the rear spar D. The reason for this difference in structural strength is due to the fact that the front spar supports approximately two-thirds of the weight of an aircraft while in flight. However, I do not desire to be limited in dimensions or proportions.

In its structural details, the front spar C includes upper and lower parts 12 and 13, respectively, which are mounted in the inboard wing section A (see Figures 4 and 5). Also, the front spar C defines upper and lower parts 14 and 15, respectively, disposed in the outboard section B of the foldable wing. When these sections are moved into active flight position, such as illustrated in Figure 4, the upper parts 12 and 14 of the front spar C are arranged in alignment with one another. The same is true of the lower parts 13 and 15 of the front spar.

Turning now to the rear spar D, it provides upper and lower parts 16 and 17, respectively, which are confined to the inboard section A. In like manner, the outboard section B contains upper and lower parts 18 and 19 of the rear spar D (see Figure 3). It will be apparent that the upper parts 16 and 18 are aligned with one another, when the outboard section B is disposed in prolongation with the inboard section; and at the same time, the lower parts 17 and 19 occupy positions of alignment.

In Figures 1 to 5, inclusive, the inboard section A has been disclosed as having ribs 20 fastened to its spar parts 12—13 and 16—17, and an inboard airfoil or skin 21 covers these ribs and spar parts. Likewise, the outboard section B includes ribs 22 secured to its spar parts 14—15 and 18—19. An outboard airfoil or skin 23 covers the latter ribs and spar parts.

Moreover, the adjacent edges 21a and 23a of the airfoils 21 and 23, respectively, are butted together when the wing sections A—B occupy their active flight positions, thereby providing a wing joint 24 therebetween. This joint slants outwardly and downwardly (see Figures 3–5) to set a wing-lock toggle mechanism E far enough out on the inboard section A to give ample clearance for a suitable actuator F as the outboard wing section B swings upwardly (see Figure 5).

For the purpose of allowing the outboard section B to be swung up and down, a hinge bolt 25 is provided between the upper parts 12—14 of the front spar C (see Figure 4). Also, a hinge bolt 26 is arranged between the upper parts 16—18 of the rear spar D (see Figure 3).

In Figures 1 and 2 of the drawings, I have shown the lower spar parts 13 and 17 as having outer ends 13a and 17a, respectively, which are offset toward one another and terminate with the bottom portion of the airfoil edge 21a. However, the inner ends 15a and 19a of the lower spar parts 15 and 19, respectively, project beyond the lower portion of the airfoil edge 23a so as to fit into spaces provided by the offset outer ends 13a and 17a, respectively, when the outboard section B of the wing is lowered into alignment with the inboard section A.

In order to lock the outboard section B in its extended or active flying position, a pair of spaced-apart bushings 27—27 have been placed in openings provided in the inner end 15a of the lower spar part 15. These bushings are adapted to be brought into axial alignment with another pair of bushings 28—28 carried by the offset end 13a of the lower spar part 13 (see Figures 1 and 2). This will allow locking detents 29—29 to be inserted through registering pairs of bushings 28—27 and 28—27 to thus interlock the lower parts 13 and 15 of the front spar C.

Further rigidity is imparted to the outboard section B to hold it in prolongation with the inner section A by providing a pair of bushings 30—30 on the inner end 19a of the lower spar part 19, which are adapted to register with a second pair of bushings 31—31 carried by the offset end 17a of the lower spar part 17 (see Figures 1 and 2). Locking detents 32—32 are insertable through the registering pairs of bushings 31—30 and 31—30 to interlock the lower parts of the rear spar D in active position.

All of these locking detents and bushings may be made of a steel alloy, if desired, having the maximum hardness and strength. Also, the spars themselves should be strongly reinforced in the vicinity of the locking pins to withstand all possible stress.

The wing-lock toggle mechanism E previously mentioned includes a casing 33, which may be anchored to the inboard section A of the wing by any suitable means, for example, bolts 34. This casing is interposed between the front spar C and the rear spar D, and has a reciprocable rod 35 slidably guided therein to extend lengthwise of the wing.

For extending and contracting the detents 29—29 to thereby lock and unlock the spar parts 13—15, respectively, toggle links 36—36 are swingably connected to these detents by journal pins 37—37. The latter are guided in slots 38—38 fashioned in a cover plate 39 of the casing 33 (see Figure 7) so as to cause these pins to operate in a straight line and thus preclude the detents 29—29 from binding. Furthermore, these detents may be guided in bearings 40—40 provided in the casing 33.

The inner ends of the toggle links 36—36 are hinged to the reciprocable rod 35 by journal pins 41—41, which are guided for movement lengthwise of the wing by slots 42—42 formed in the cover plate 39 (see Figure 7).

As disclosed in Figures 1 and 2, a second set of toggle links 43—43 are hinged to the rod 35 at their inner ends by the journal pins 41—41, while their outer ends are connected by journal pins 44—44 to inner ends of extension links 45—45. The latter pins are guided in slots 46—46 provided in the cover plate 39 in parallel relation with the slots 38—38. Figures 1, 2 and 7 disclose the outer ends of these extension links as being hingedly connected by journal pins 47—47 to the detents 32—32, while intermediate portions of the links 45—45 are slidably mounted in the casing 33.

It will be noted that when the outboard wing section B is locked down to the inboard section A, as in Figure 1, the toggle links 36—36 and 43—43 are in perfectly straight alignments, making it impossible for the detents 29—29 and 32—32 to accidentally move out of the bushings 27—27 and 30—30, respectively.

However, when the central rod 35 is moved to the left until it occupies the position shown in Figure 2, the detents 29—29 are retracted from the bushings 27—27 of the outboard spar part 15, but still remain in the bushings 28—28 of the inboard spar part end 13a. Likewise, the detents 32—32 are withdrawn from the bushings 30—30 of the outboard spar part end 19a, but remain in the bushings 31—31 of the inboard spar end 17a. The slots 38—38, 42—42 and 46—46 limit the inward and outward movement of the detents 29—29 and 32—32.

Inasmuch as the locking detents move through only relatively short distances during travel out of the outboard spar parts, the wing-lock toggle mechanism E has been kept quite small; accordingly the extension links 45—45 have been provided to connect the detents 32—32 to the toggle mechanism. Also, this will minimize the necessary travel of the actuator F, which operates the rod 35, during locking and unlocking of the outboard spar parts.

Next I shall describe the details of the actuator F and a control mechanism G provided in connection therewith (see Figures 5 and 6). This actuator has been illustrated as being selected from a hydraulic type. It includes a cylinder 48 having a piston 49 slidably arranged therein. This cylinder may be swingably connected by a hinge pin 50 to a bracket 51, which in turn is secured to the lower portion of the outboard wing section B by any suitable means, such as a reinforcing plate 52 anchored to the spar parts 15 and 19 (see Figures 1–2 and 4–5).

As clearly illustrated in the drawings, a piston rod 53 is reciprocably mounted in the cylinder 48, with its inner end being secured to the piston 49 and its outer end connected by a pivot pin 54 to the outboard portion of the toggle mechanism rod 35. During the initial movement of the piston rod 53 to the left in Figure 1, the toggle mechanism E is actuated to unlock the outboard spar parts 15—19 (see Figure 2); and as this piston rod continues its uninterrupted outward travel, the actuator F raises the outboard wing section B into folded position, as illustrated in Figure 5. Of course, reverse movement of the piston rod will operate to first lower the outboard section B into alignment or prolongation with the inboard section A; and, thereafter, interlock the two sections by actuating the wing-lock mechanism E, all in one continuous movement of the piston rod.

Turning to Figures 5 and 6, the control mechanism G has been shown diagrammatically as including a storage reservoir 55 containing fluid 56. The latter may be withdrawn by a pump 57 through a pipe 58, and delivered under pressure to an intake line 59 of a valve body 60. Within this body there is mounted a swingable vane 61, which is operable by handle 62. This body 60 and vane 61 define interior passageways 63 and 64 through which the fluid may flow.

Flexible hoses 65 and 66 lead from the valve body to inboard and outboard ports 65a and 66a, respectively, at the opposite ends of the cylinder 48 (see Figures 5 and 6). These ports communicate with the interior bore of the cylinder.

When the handle 62 is disposed in the full-line position shown in Figure 5, designated by the legend "Up," fluid will flow from the pump 57 through the intake line 59 to the interior passageway 63, and thence through the hose 66 to the outboard port 66a of the cylinder 48. This will result in extending the piston rod 53 relative to the cylinder 48, causing the toggle mechanism E to unlock the outboard section B and folding the latter upwardly. Simultaneously, fluid disposed in the interior of the cylinder 48 inboard of the piston 49 will be forced through the hose 65, through the interior passageway 64, and will be conveyed by a pipe 67 back to the reservoir 55.

As a precautionary measure, I have shown a safety catch 68 on the handle 62, which must be released before the latter can be moved to "Up" or wing-fold position. This safety feature will prevent the pilot from raising the wing accidentally, instead of the landing gear, as could happen after takeoff.

Assuming that the outboard section B has been raised, and that the pilot desires to lower this section into an extended or active flight position, the handle 62 is swung into "Down" position, as shown in Figure 6. With the pump 57 operating at this time, fluid will be delivered through the interior passageway 64 and hose 65 to the inboard port 65a of the cylinder 48. This will cause the piston 49 to move toward the outboard end of this cylinder, and thereby lower the outboard section B into the position disclosed in Figure 4. At the same time, fluid in the outboard end of the cylinder will be exhausted through the port 66a and passageway 63 into the pipe 67 for return to the reservoir 55.

After the outboard section B swings into alignment with the inboard section A, the toggle mechanism E will be moved from the disposition shown in Figure 2 into that illustrated in Figure 1, all in one continuous operation, causing the detents 29—29 and 32—32 to interlock the outboard and inboard spar parts.

In Figure 4, the hinge bolt 25, which connects the upper front spar parts 12—14, has been shown as being arranged vertically above substantially the midpoint between the locking detents 29—29. The same is true of the hinge bolt 26 relative to the locking detents 32—32 in Figure 3. Of course, the bolts 25—26 are arranged in axial alignment with one another. Figure 5 clearly discloses the mechanical advantage obtained by the hydraulic cylinder 48 in swinging the outboard section B of the wing about these pivot bolts to thereby swing the outboard section with the minimum amount of effort.

The plate 39, preferably of steel, telescopes over the journal pins 37—37, 41—41 and 44—44; and, also, is arranged above the toggle links 36—36 and 43—43. Accordingly, this plate will take any upward strain as the outboard wing section B is swung beyond top dead center, that is, counter-clockwise from the position shown in Figure 5, thereby relieving the toggle mechanism E of undue strain. This plate may be secured in place by the bolts 34 previously described.

*Summary*

The actuation of my foldable aircraft wing with mechanism for operating and locking the outboard section thereof is summarized briefly as follows:

Assuming that the outboard wing section B is arranged in its active flying position, as shown in Figure 1, and locked down to the inboard section A, and that the pilot desires to fold the outboard section upwardly, this result is accomplished by releasing the safety catch 68 and swinging the handle 62 to "Up" position (see Figure 5).

With the pump 57 operating at this time, fluid 56 will be withdrawn from the reservoir 55, and forced through the line 59, interior passageway 63, hose 66 and port 66a to the interior of the cylinder 48. The fluid thus delivered to the cylinder will extend the piston rod 53. Initially the latter will push the reciprocable rod 35 of the wing-lock toggle mechanism E into the position illustrated in Figure 2, thereby withdrawing the detents 29—29 and 32—32 from the outboard spar parts 15 and 19, respectively.

Now further outward extending of the piston rod 53 relative to its cylinder 48 will cause the outboard section B of the foldable wing to swing upwardly into the position shown in Figure 5. The upward swinging of this wing section follows the unlocking thereof without interruption. Of course, fluid contained in the cylinder 48 inboard of the piston 49 will be forced through the hose 65, interior passage 64 and pipe 67 back to the reservoir.

Subsequent return to the outboard section B into lowered extended arrangement relative to the inboard section A may be accomplished by swinging the handle 62 into "Down" position (see Figure 6). This will cause the pump 57 to force fluid under pressure through the interior passageway 64, hose 65 and port 65a to the inboard end of the cylinder 48. Simultaneously therewith, fluid will be exhausted from the outboard port 66a, hose 66, interior passageway 63 and returned to the reservoir by the pipe 67.

This will result in retracting the piston rod 53 with respect to the cylinder 48, causing the outboard wing section B to be lowered in alignment with the inboard section A. During the latter part of this inward travel of the piston rod, the rod 35 and the toggle links 36—36 and 43—43 will move the detents 29—29 and 32—32 outwardly until these detents interlock the outboard and inboard sections of the wing—all in one continuous operation and with the minimum of effort.

I claim:

1. In a foldable aircraft wing: inboard and outboard wing sections, the latter being swingable relative to the former between flight and upwardly-folded positions; the outboard section, when in flight position, projecting lengthwise in a lateral direction beyond an outer end of the inboard section; a spar extending lengthwise of the wing, and including inboard and outboard spar parts secured to the inboard and outboard wing sections, respectively; hinge means securing these spar parts together, and including a pivot about which the outboard wing section may be swung between flight and upwardly-folded positions; a wing-lock mechanism for locking and unlocking the outboard spar part with the inboard spar part; and common means for unlocking said mechanism and then sequentially raising the outboard wing section into folded position in a continuously-folding operation; said common means being operable for lowering the outboard wing section into flight position and sequentially locking said mechanism in a continuous wing-extending operation; said wing-lock mechanism including a toggle operated by said common means, and further including detents actuated by the toggle; said detents being movable into an advanced position to interlock the inboard and outboard spar parts, and being retractable to unlock said parts; said toggle being movable into a position to prevent the detents from being retracted accidentally into unlocked position.

2. In a foldable aircraft wing: inboard and outboard wing sections, the latter being swingable relative to the former between flight and upwardly-folded positions; the outboard section, when in flight position, projecting lengthwise in a lateral direction beyond an outer end of the inboard section; front and rear spars extending lengthwise of the wing, each including inboard and outboard spar parts secured to the inboard and outboard wing sections, respectively; hinge means securing inboard and outboard spar parts together, and including pivots about which the outboard wing section may be swung between flight and upwardly-folded positions; a wing-lock mechanism including toggle-actuated detents for locking and unlocking the outboard spar parts of the front and rear spars with the inboard spar parts of the front and rear spars, respectively; and common means for unlocking said mechanism and sequentially raising the outboard wing section into folded position in a continuous wing-folding operation; said common means being operable for lowering the outboard wing section into flight position and sequentially locking said mechanism in a continuous wing-extending operation.

3. In a foldable aircraft wing: inboard and outboard wing sections, the latter being swingable relative to the former between flight and upwardly-folded positions; the outboard section, when in flight position, extending in a lateral direction beyond an outer end of the inboard section; front and rear spars extending lengthwise of the wing, each including inboard and outboard spar parts secured to the inboard and outboard wing sections, respectively; hinge means securing inboard and outboard spar parts together, and including pivots about which the outboard wing section may be swung between flight and folded positions; a wing-lock mechanism located in the inboard wing section between the front and rear spars; said mechanism including a reciprocable rod and at least a pair of toggle links pivotally secured to said rod to be operated thereby; these toggle links extending in opposite directions towards the spar parts; each link having a detent attached thereto; the detents being movable into advanced positions by the toggle links and said rod to interlock the inboard and outboard spar parts, and being retractable to unlock said parts; and an actuator accommodated in the outboard wing section; said actuator including a pair of members, one being extendible relative to the other; the extendible member being connected to the reciprocable rod of the wing-lock mechanism, and the other member being anchored to the outboard wing section; the extendible member being movable for retracting said detents from the outboard spar parts and sequentially raising the outboard wing section into folded position in a continuous wing-folding operation; said extendible member being retractable for lowering the outboard wing section into flight position and sequentially advancing the detents for interlocking the inboard and outboard spar parts in a continuous wing-extending operation.

4. The combination as set forth in claim 3, in which two pairs of said toggle links are pivotally attached to said reciprocable rod for operation thereby; two of the links having detents positioned for interlocking the inboard and outboard parts of the front spar; the other two links being provided with detents disposed for interlocking the inboard and outboard parts of the rear spar.

References Cited in the file of this patent

UNITED STATES PATENTS

| | | |
|---|---|---|
| 2,290,850 | Umschweif | July 21, 1942 |
| 2,343,645 | Dickenson et al. | Mar. 7, 1944 |
| 2,536,086 | Pomykala | Jan. 2, 1951 |

FOREIGN PATENTS

| | | |
|---|---|---|
| 420,209 | Great Britain | Nov. 22, 1934 |
| 490,964 | Great Britain | Aug. 24, 1938 |